United States Patent [19]

Hunter et al.

[11] 4,180,092

[45] Dec. 25, 1979

[54] CENTER PIVOT CONSTRUCTION FOR CENTER PIVOT SPRINKLER

[75] Inventors: Richard E. Hunter, Greeley; Robert C. Shook, Kersey, both of Colo.

[73] Assignee: Irrigation & Power Equipment, Inc., Greeley, Colo.

[21] Appl. No.: 889,224

[22] Filed: Mar. 23, 1978

[51] Int. Cl.$^2$ .................... B05B 3/12; F16L 21/00
[52] U.S. Cl. .................... 137/344; 239/177; 285/31; 285/165
[58] Field of Search .............. 137/344; 239/177; 285/16, 31, 165, 370

[56] References Cited

U.S. PATENT DOCUMENTS

| | | | |
|---|---|---|---|
| 2,461,828 | 2/1949 | Lomelino | 285/31 |
| 2,604,359 | 7/1952 | Zybach | 239/177 |
| 3,353,848 | 11/1967 | Bleasby | 285/165 |
| 3,608,826 | 9/1971 | Reinke | 137/344 |
| 3,628,729 | 12/1971 | Thomas | 137/344 |
| 3,782,683 | 1/1974 | Lee et al. | 285/16 |
| 3,784,106 | 1/1974 | Ross | 239/177 |

*Primary Examiner*—Martin P. Schwadron
*Assistant Examiner*—A. Michael Chambers
*Attorney, Agent, or Firm*—Poms, Smith, Lande & Rose

[57] ABSTRACT

The present invention discloses an improved center pivot for a self-propelled center pivot irrigation system. The preferred embodiment is characterized by a vertical pivot pipe supported for rotational movement at both the upper and lower extremities thereof. Additionally, the gasket assembly providing leak-proof rotational movement of the pivot pipe relative to a fixed liquid supply pipe is characterized by a slideable casing which can be moved from a normal operating position wherein the fixed supply pipe and the rotating pivot pipe are bridged by the casing with gaskets disposed between mating surfaces and a second non-bridged position wherein the gaskets are removable so as to allow replacement of worn gaskets without moving or removing any of the major pipe components of the sprinkler system. In the preferred embodiment, a strain relief assembly is carried by the casing and connectable to a conduit pipe extending the length of the pivot pipe to a packing gland at the top thereof through which the conduit pipe passes to connect to a collector ring assembly.

13 Claims, 9 Drawing Figures

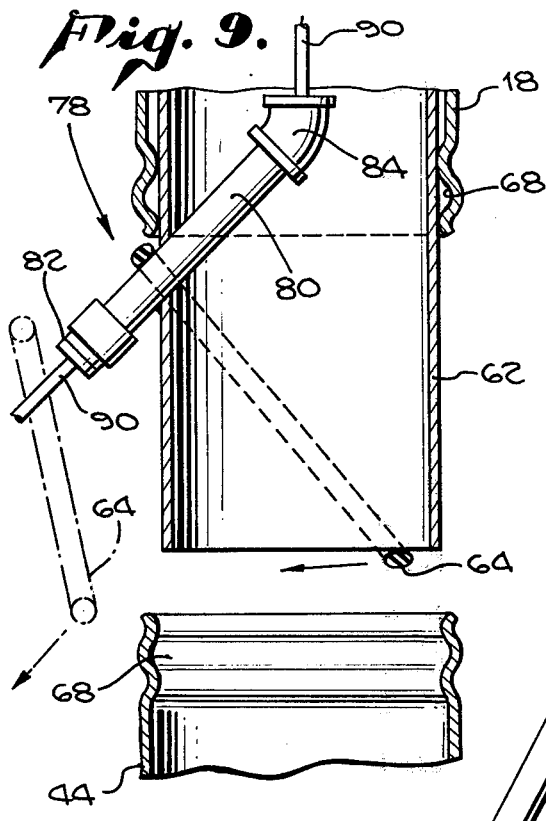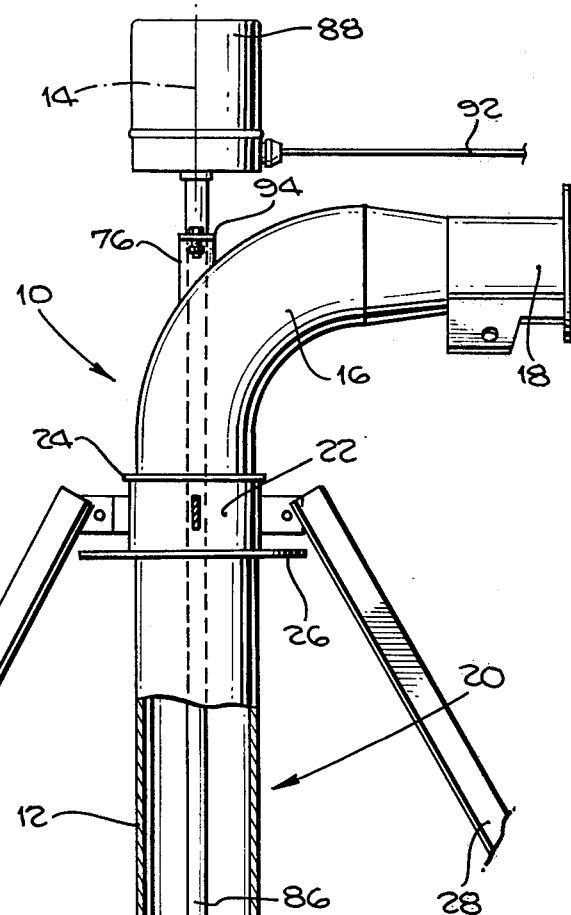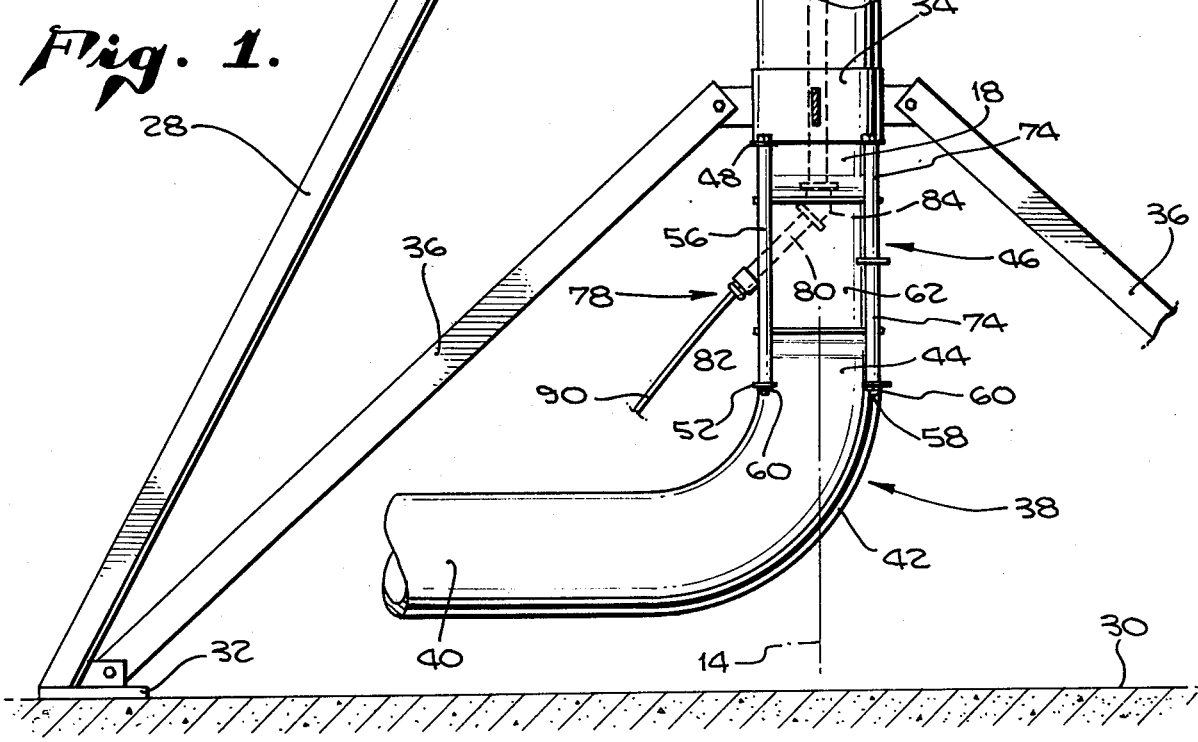

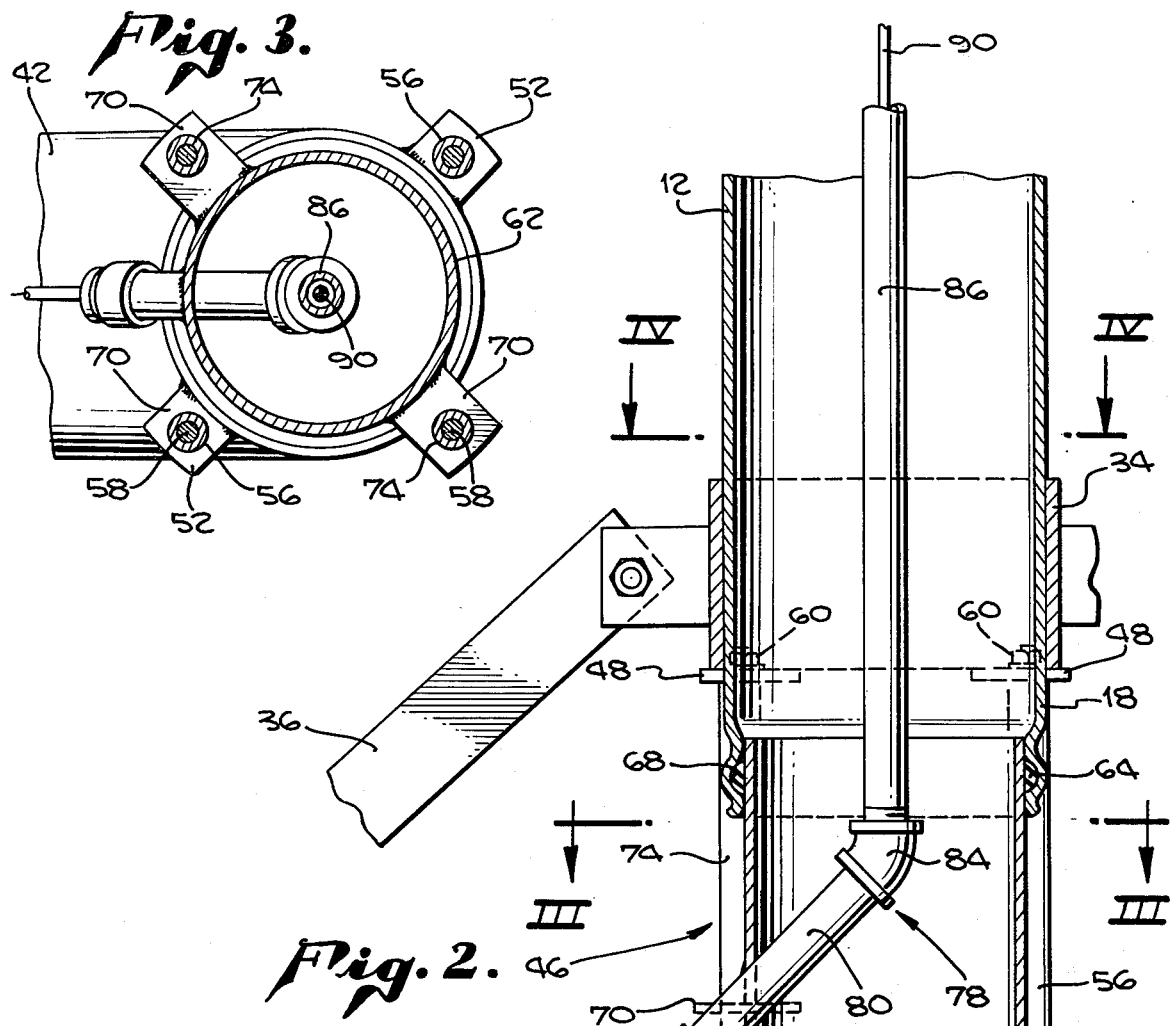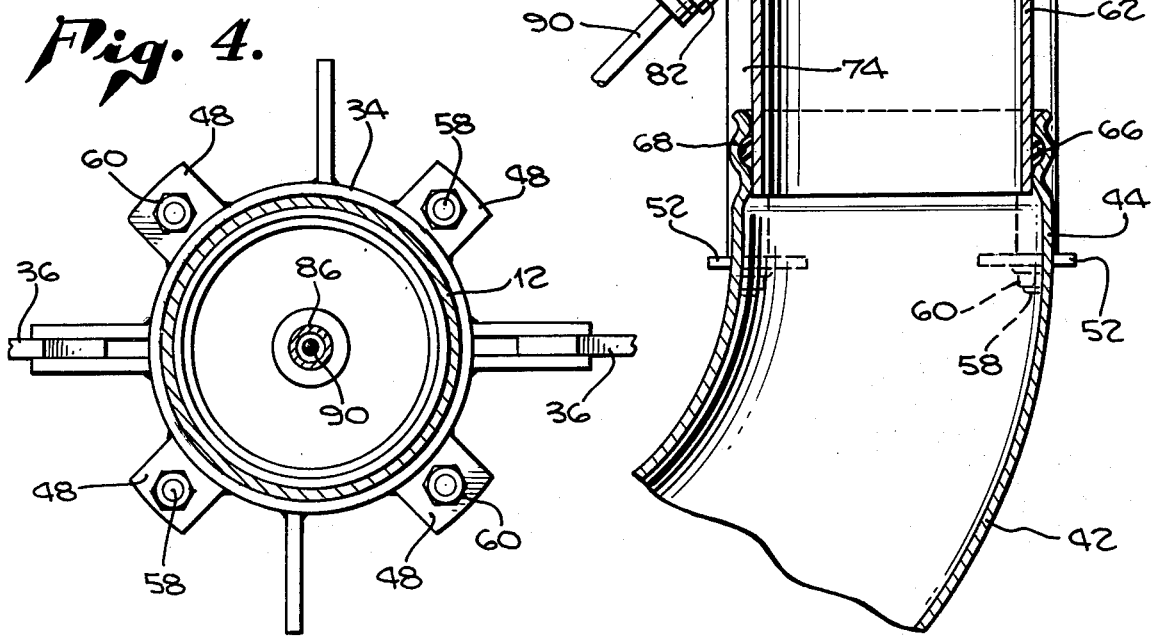

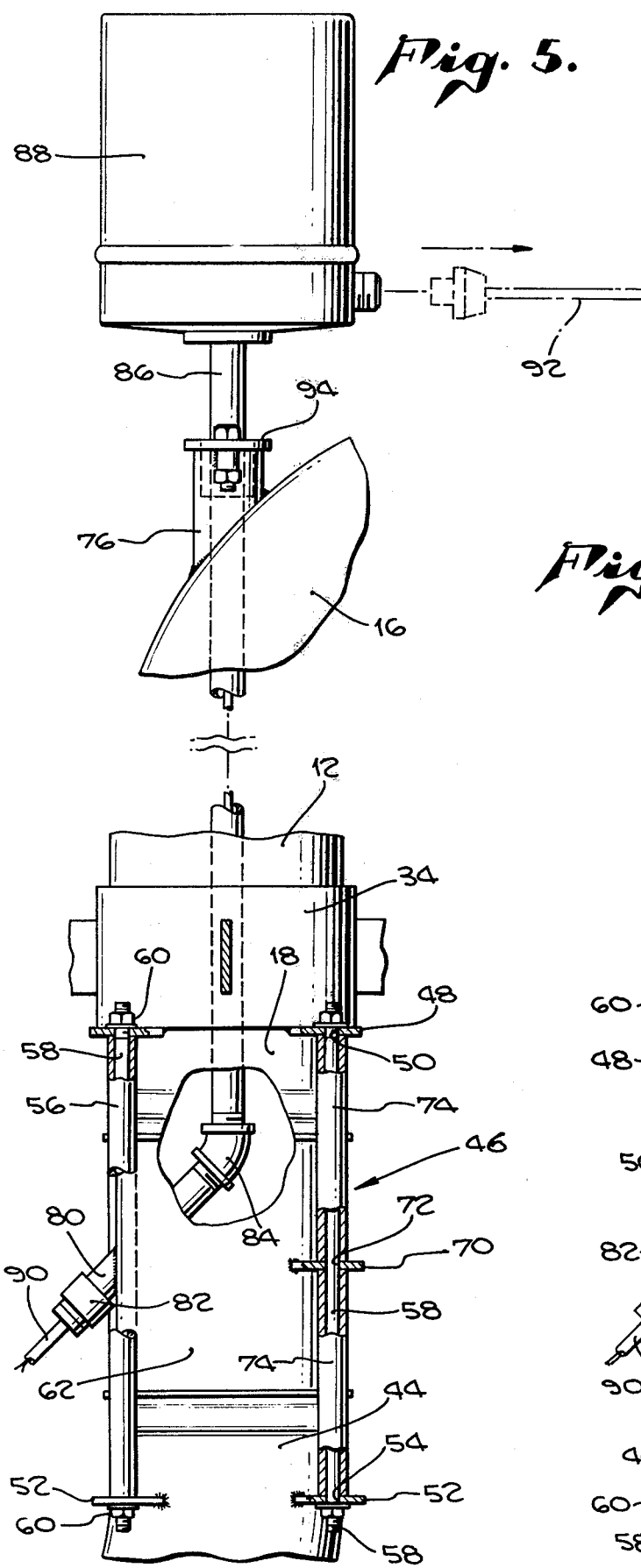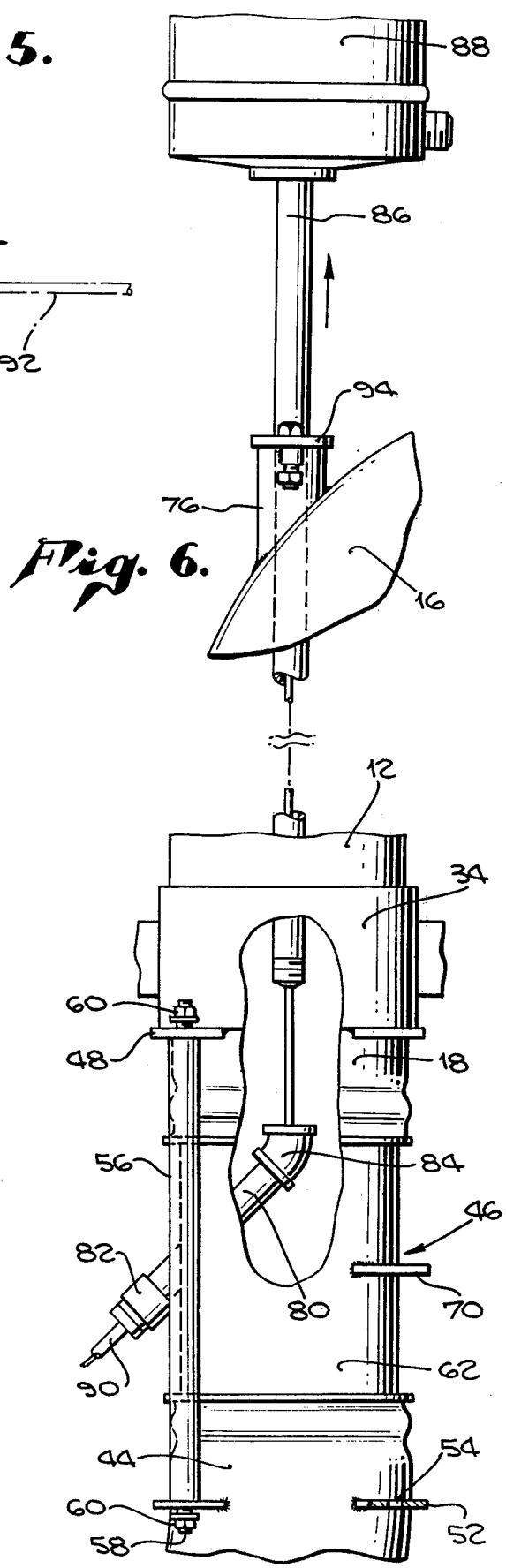

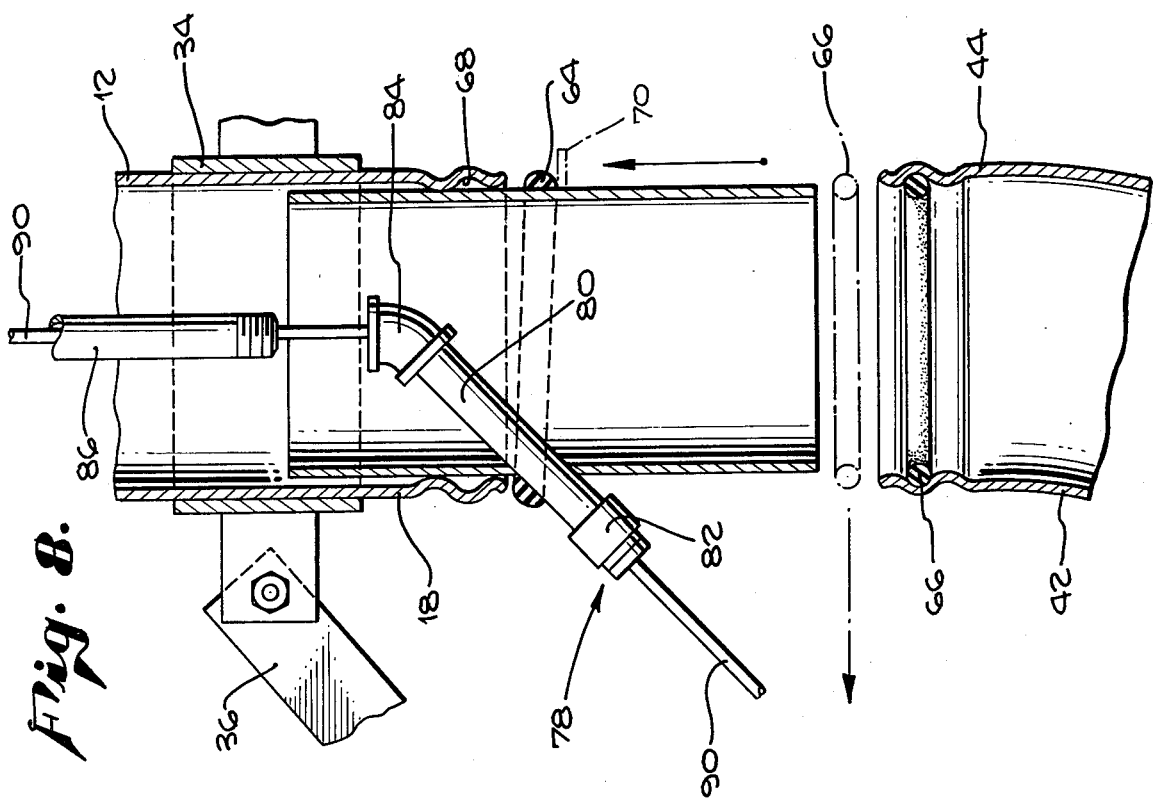
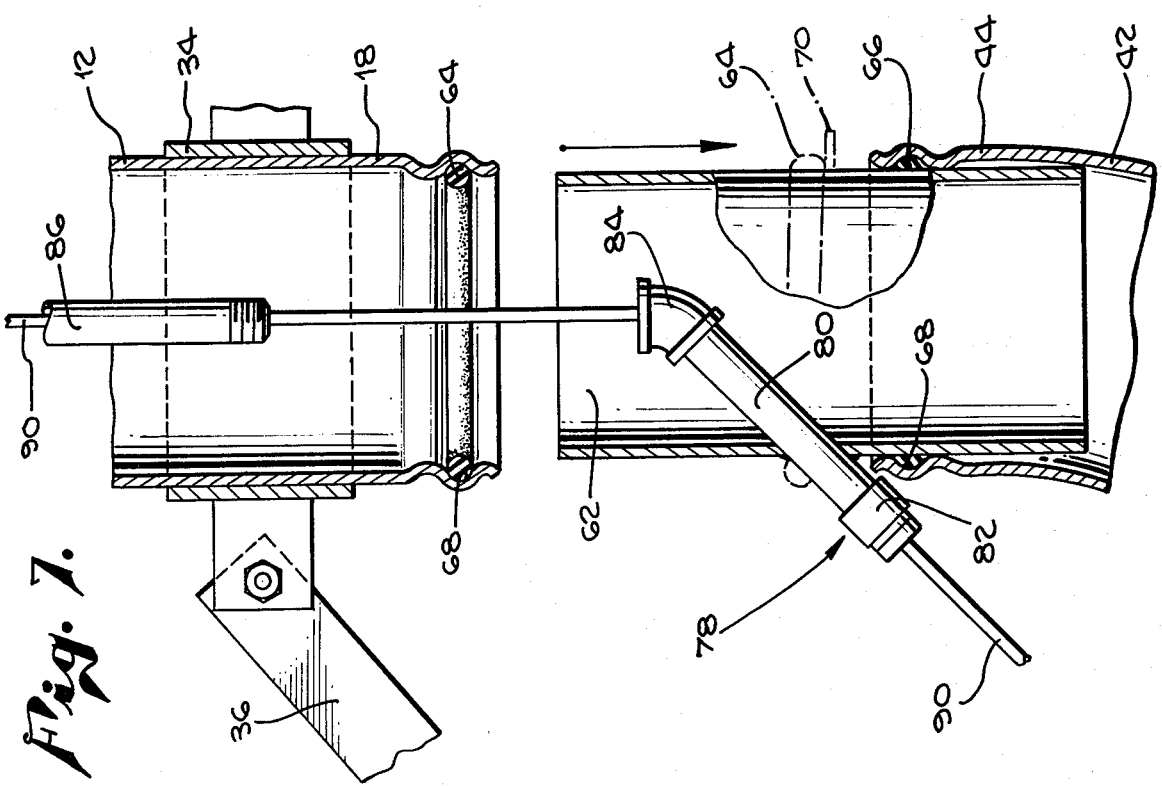

CENTER PIVOT CONSTRUCTION FOR CENTER PIVOT SPRINKLER

BACKGROUND OF THE INVENTION

The present invention relates to self-propelled center pivot irrigation systems and more particularly to the construction of the center pivots employed therein.

In a self-propelled center pivot irrigation system, one or more span units connected longitudinally together rotate about a center pivot supplying water under pressure on one or more wheeled power frames. Each span unit includes a water supply pipe which can be connected to the next adjacent units. The first water pipe is connected to the center pivot water supply. The end of the last water pipe is sealed. Each of the pipes is provided with a plurality of sprinklers disposed at intervals along the length thereof communicating with the interior. Thus, if a supply of water under pressure is introduced at the pivot end of the pipe traversing the span units, the water will immerge from the sprinklers providing uniform irrigation of a circular area as the span units rotate about the center pivot.

In such apparatus, the construction of the center pivot is of major concern. In contemporary self-propelled center pivot irrigation systems, electrical power and control signals must be passed back and forth to and between the span units and the wheeled power frames in addition to the basic problem of supplying water to the span units. Thus, the center pivot typically incorporates the ability to go from both a positionally fixed electrical and water supply system to a rotational system. This is typically accomplished by having a lower elbow connectable on one side to a pipe at ground level supplying the water under pressure. The elbow then changes direction to a vertical direction where it is connected to a pivot pipe which rises vertically to the desired level of the horizontal span units where it connects to a second, 90°, elbow providing the transition from vertical to horizontal and means for connecting the water pipe of the first span unit. Between the lower elbow and the upper elbow a slip joint incorporating a gasket is provided. Rotation occurs at the slip joint such that the portion of the system below the slip joint remains fixed and the position above the slip joint is free to rotate. The gasket employed within the slip joint provides a leak-proof seal between the fixed and rotating elements thereof. To provide electrical connection, a conduit is typically extended longitudinally through the length of the vertical pipe to pass through the wall of the lower elbow at the bottom and through a packing gland disposed in the wall of the upper elbow at the top. A collector ring assembly is mounted on the upper end of the conduit and any electrical connection is passed through the conduit to the collector ring and thence to a connecting cable extending from the collector ring along the span units as necessary.

Because of the size, weight, environment, and materials from which such apparatus is made, the gasket must be periodically replaced. For the same reasons, some prior art center pivots have incorporated the gasket and bearing functions into a single apparatus in an attempt to provide ease of such gasket replacement. An example of such center pivot construction can be seen in U.S. Pat. No. 3,628,729 with particular reference to FIGS. 1, 9, 12 and 21 and the discussion beginning at column 6, line 70 thereof. Such apparatus typically results in severe loading problems on the bearing requiring the choice between heavier duty and, consequently, more expensive bearing construction on one hand and more frequent bearing problems on the other. Even in such combination bearing and gasket assemblies, however, the changing of the gaskets is often a difficult operation requiring the movement of heavy pipe sections and fittings.

Wherefore it is the object of the present invention to provide an improved center pivot for such self-propelled center pivot irrigation systems wherein the pivoting portion is adequately supported by a simple, lightweight, inexpensive bearing structure providing no radial loading on the gaskets and wherein the gaskets are easily replaceable without disassembly and/or movement of large pipe sections and fittings.

SUMMARY OF THE INVENTION

The foregoing objectives have been realized by the apparatus of the present invention which comprises a pivot conduit disposed vertically along an axis of rotation. The pivot conduit terminates at an upper end connectable to a span unit and terminates a lower end in a vertical cylindrical segment. A bearing and support assembly is provided which supports the pivot conduit for rotation about the axis of rotation. In the preferred embodiment, the bearing and support assembly has an upper bearing adjacent the upper end of the pivot conduit and a lower bearing adjacent the lower end of the pivot conduit. A fixed conduit is provided which is connectable on one end to the source of irrigation water under pressure and which terminates at the other end in a vertical cylindrical segment disposed along the axis of rotation in concentric facing relationship to the cylindrical segment of the pivot conduit. Means are connected between the lower bearing and the fixed conduit for holding the fixed conduit in the afore-mentioned concentric, facing, spaced relationship relative to the cylindrical segment of the pivot conduit. A gasket and gap bridging assembly is disposed along the axis of rotation between the cylindrical segments of the pivot and fixed conduits. The bridging assembly includes a bridging conduit of a length relative to the spacing between the cylindrical segments such that in a first position the bridging conduit is in overlapped mating relationship with both the pivot conduit and the fixed conduit and in a second position the bridging conduit is in spaced end to end relationship with the pivot conduit. The bridging assembly further includes means for holding the bridging conduit in the first position and at least a gasket disposed between the overlapping surfaces of the bridging conduit and the pivot conduit to form a leak-proof rotational junction between these two members when the bridging conduit is in the first position. By removing the holding means and sliding the bridging conduit to the second position, the gasket can be removed.

DESCRIPTION OF THE DRAWINGS

FIG. 1 is a partially cut away elevation of the center pivot according to the preferred embodiment of the present invention.

FIG. 2 is a detailed cut away side elevation of the gasket and gap bridging assembly of the present invention in its normal operating position.

FIG. 3 is a top view of a section through the apparatus of FIG. 2 at the plane III—III within the bearing and support assembly.

FIG. 4 is a top view of a section taken through the apparatus of FIG. 2 at the plane IV—IV above the bearing and support assembly.

FIG. 5 is a partial view of the apparatus of FIG. 1 following the first four steps of the disclosed procedure for replacing the gaskets in the preferred embodiment of the present invention.

FIG. 6 is a partial view of the apparatus of FIG. 1 showing the relationship of the elements thereof following the eighth step in the gasket replacement procedure.

FIG. 7 is a detailed drawing of the bearing and support assembly of the present invention following the ninth step and tenth step (ghosted) in the gasket replacement procedure.

FIG. 8 is a detailed drawing of the bearing and support assembly following steps eleven and twelve (ghosted) of the gasket replacement procedure.

FIG. 9 is a detailed drawing of the bearing and support assembly following the thirteenth (final) step of the gasket removal procedure.

DESCRIPTION OF THE PREFERRED EMBODIMENT

Referring first to FIG. 1, the center pivot of the present invention is indicated generally as 10. Center pivot 10 comprises a pivot conduit 12 disposed vertically along an axis of rotation 14. Pivot conduit 12 terminates at its upper end in upper elbow 16 having connecting means 18 at the open end thereof to provide a generally horizontal open end connectable to a span unit (not shown). Pivot conduit 12 terminates at its lower end in a vertical cylindrical segment 18 having an open end adapted to receive a flow of liquid. A bearing and support assembly generally indicated as 20 is provided to support the pivot conduit 12 for rotation about the axis of rotation 14. In the preferred embodiment as shown, bearing and support assembly 20 comprises an upper bearing 22 disposed about pivot conduit 12 which comprises a cylindrical pipe throughout its entire length. Upper bearing 22 is retained between upper flange 24 and lower flange 26 which are attached to pivot conduit 12. Upper bearing 22 is supported by upper pivot legs 28. In the preferred embodiment, there are four upper pivot legs 28 connected at 90° intervals around upper bearing 22. The opposite ends of upper pivot legs 28 are fastened to an appropriate solid surface, such as concrete base 30, with brackets 32. Bearing and support assembly 20 further includes lower bearing 34 disposed at the bottom of pivot conduit 12 above vertical cylindrical segment 18. As in the manner of upper bearing 22, lower bearing 34 is rigidly held in position by lower pivot legs 36 connected between lower bearing 34 and brackets 32. As thus configured, pivot conduit 12 is free to rotate about axis of rotation 14 on bearings 22 and 34. Longitudinal movement along the axis of rotation 14 by pivot conduit 12 is prevented by upper flange 24 and lower flange 26. The weight force appearing within center pivot 10 primarily appears as an equal loading of upper flange 24 bearing on the top surface of the upper bearing 22. Rotation in a vertical plane of pivot conduit 12 about bearing 22 at upper flange 24 is prevented by the lower bearing 34. This construction supports the pivot conduit for rotation only about the axis of rotation 14 and virtually eliminates the possibility of any radial loading on the gaskets to be described hereinafter.

While in the apparatus as heretofore described pivot conduit 12 comprises a cylindrical pipe, it is to be understood that pivot conduit 12 need be cylindrical only in the areas under upper bearing 22 and lower bearing 34, and comprising vertical cylindrical segment 18.

To the foregoing is added a fixed conduit generally indicated as 38 disposed in a manner to be hereinafter described in greater detail. In the preferred embodiment as shown in FIG. 1, fixed conduit 38 comprises a pipe 40 connectable on one end to a source of irrigation water under pressure (not shown). Pipe 40 is connected to a lower pivot elbow 42 which terminates in a vertical cylindrical segment 44 having an open end adapted to direct a flow of liquid into the open end of segment 18 by being disposed along the axis of rotation 14 in concentric facing, spaced relationship to the cylindrical segment 18 of pivot conduit 12.

The vertical cylindrical segments 18 and 44 are maintained in their concentric, facing, spaced relationship by a gasket and gap bridging assembly generally indicated as 46. The position maintaining aspect of gasket and gap bridging assembly 46 can best be understood with reference to FIGS. 1, 4, and 5. Lower bearing 34 has brackets 48 attached thereto at 90° intervals around the circumference extending outwardly in a plane normal to the axis of rotation 14. Each bracket 48 has a hole 50 therethrough through which a threaded rod, to be hereinafter described, can be passed in a line parallel to the axis of rotation 14. In a similar manner, brackets 52 having holes 54 therethrough are attached to the outer periphery of fixed conduit 38 adjacent vertical cylindrical segment 44 so as to have respective ones of brackets 48 and brackets 52 be aligned with holes 50 and 54 disposed along a line parallel to the axis of rotation 14. Two large cylindrical spacers 56 of a length equal to the distance between brackets 48 and 52 are disposed between two 180° separated pairs of aligned brackets 48 and 52 concentric with holes 50 and 54. Threaded rods 58 are passed through the two bracket 48, spacer 56, bracket 52 combinations. Nuts 60 are threaded onto the ends of threaded rods 58 and tightened to secure brackets 48 and 52 tightly against opposite ends of large spacers 56 to thereby hold vertical cylindrical segments 18 and 44 in the desired concentric, facing, spaced relationship. The two remaining bracket pairs 48, 52, are used in a manner to be described hereinafter. While cylindrical spacers are preferred, angle or bar stock could be employed by placing it adjacent threaded rods 58 between brackets 48 and 52.

The construction of the remainder of the gasket and gap bridging assembly 46 can best be understood with reference to FIGS. 1, 2, 3, and 5. As previously mentioned, vertical segments 18 and 44 are aligned concentrically with the axis of rotation 14 in face to face spaced relationship as shown. In the preferred embodiment, vertical cylindrical segments 18 and 44 are of identical internal diameter. A bridging conduit is necessary to close the space between the ends of cylindrical segments 18 and 44. In the preferred embodiment shown, this bridging conduit takes the form of cylindrical inner casing 62. Inner casing 62 has an outside diameter substantially equal to the inside diameter of cylindrical segments 18 and 44. In this manner, inner casing 62 can be positioned as shown in FIG. 2 in overlapped mating relationship with both cylindrical segment 18 and cylindrical segment 44. That is, with inner casing positioned within segments 18 and 44, cylindrical segment 18 overlaps the upper end of inner casing 62 and cylindrical lapped with segment 44 and in spaced end to end relationship with segment 18 where a single gasket could be removed and inserted. In such later configuration, however, the gasket employed would have to be discontinuous (i.e. not a closed circular O) to allow removal and replacement around conduit 88 and/or connector 90 as the gasket could no longer be slid over inner casing 62 to be removed from the bottom thereof as in the preferred embodiment and procedure.

Having thus described our invention, we claim:

1. In a self-propelled center pivot irrigation system having one or more span units rotating about a center pivot on one or more wheeled power frames wherein the center pivot includes gasket means for allowing leak-proof rotation of a vertical pipe about an axis common to a fixed pipe supplying liquid under pressure to the rotating pipe, the improved center pivot comprising:
   (a) a first pipe connectable on one end to a rotating span unit and terminating on the other end in a cylindrical segment;
   (b) bearing and support means for rotatably holding said cylindrical segment of said first pipe concentric with a vertical axis of rotation;
   (c) a second pipe connectable on one end to a source of liquid under pressure and terminating on the other end in a cylindrical segment;
   (d) first spacer means connected between said bearing and support means and said second pipe for holding said cylindrical segment of said second pipe in concentric facings spaced relationship with said cylindrical segment of said first pipe;
   (e) a casing adapted to mate in concentric sliding relationship with said cylindrical segment of said second pipe on one end and with said cylindrical segment of said first pipe on the other end, said first and second pipes being so spaced by said first spacer means and said cylindrical casing being of a length such that in a first position said casing is in overlapped mating relationship with both said first pipe and said second pipe, in a second position said casing is in overlapped mating relationship with said first pipe and in spaced end to end relationship with said second pipe, and in a third position said casing is in overlapped mating relationship with said second pipe and in spaced end to end relationship with said first pipe, said casing being slideable along said axis of rotation between said first, second and third positions;
   (f) means for releasably holding said casing in said first position;
   (g) a first gasket disposed between the overlapping surfaces of said casing and said first pipe; and,
   (h) a second gasket disposed between the overlapping surfaces of said casing and said second pipe.

2. In a self-propelled center pivot irrigation system wherein the center pivot has means for providing electrical connection to at least one rotating span unit including a conduit pipe interior of said pivot for conducting an electrical wire and being disposed on one end to pass through a packing gland on said axis of rotation to a collector ring assembly, the improved center pivot as claimed in claim 1 and additionally comprising:
   a strain relief conduit assembly carried by said casing and passing through the wall of said casing, the interior end of said conduit being connectable to the other end the conduit pipe whereby an electrical wire can be conducted from outside the pivot through said strain relief conduit into the conduit pipe and thence to the connector ring assembly.

3. The improved center pivot for an irrigation system claimed in claim 1 wherein:
   (a) said first and second gaskets are pressure actuated flexible pipe seal type gaskets; and,
   (b) said cylindrical segments of said first and second pipes include means for releasably holding said gaskets in position.

4. The improved center pivot for an irrigation system claimed in claim 1 wherein said means for releasably holding said casing in said first position comprises:
   (a) removable second spacer means connected between said bearing and support means and said casing; and,
   (b) removable third spacer means connected between said second pipe and said casing.

5. The improved center pivot for an irrigation system claimed in claim 4 wherein:
   (a) said bearing and support means includes first and second brackets in a plane normal to said axis of rotation, each of said brackets having a hole therethrough;
   (b) said second pipe has third and fourth brackets attached thereto in a plane normal to said axis of rotation; each of said brackets having a hole therethrough;
   (c) said casing has a fifth bracket having a hole therethrough attached thereto in a plane normal to said axis of rotation;
   (d) said first spacer means comprises a first threaded rod disposed to pass through the holes of said first and third brackets along a line parallel to said axis of rotation, a first spacer element positioned adjacent said first threaded rod and extending between said first and third brackets, and a pair of nuts threaded onto opposite ends of said first threaded rod to hold said first and third brackets tight against opposite ends of said first spacer element; and,
   (e) said second and third spacer means comprise a second threaded rod disposed to pass through the holes of said second, fifth, and fourth brackets along a line parallel to said axis of rotation, second and third spacer elements positioned adjacent said second threaded rod and extending between said second and fifth brackets and said fifth and fourth brackets respectively, and a pair of nuts threaded onto opposite ends of said second threaded rod to hold said second and fifth brackets tight against opposite ends of said second spacer element and said fifth and fourth brackets tight against opposite ends of said third spacer element.

6. In a self-propelled center pivot irrigation system having one or more span units rotating about a center pivot the improved center pivot comprising:
   (a) a pivot conduit disposed vertically along an axis of rotation, said pivot conduit terminating at an upper end connectable to a span unit, said pivot conduit terminating at a lower end in a vertical cylindrical segment;
   (b) a fixed conduit connectable on one end to a source of liquid under pressure and terminating at the other end in a vertical cylindrical segment disposed along said axis of rotation in concentric facing relationship to said cylindrical segment of said pivot conduit; and, segment 44 overlaps the lower end of inner casing 62. A pair of pressure actuated flexible pipe seal type gaskets 64 and 66 (such as those commonly referred to as "O-rings") are positioned between the overlapping portions of inner casing 62 and segments 18 and 44 respectively. In the preferred embodiment as shown, both segments 18 and 44 are provided with a groove 68 for releasably holding the gaskets 64 and 66 in position. Sufficient clearance is allowed between the external diameter of the inner casing 62 and the internal diameter of cylindrical segments 18 and 44 to allow inner casing 62 to be slid axially along the axis of rotation either up or down from the first position wherein both vertical cylindrical segments 18 and 44 overlap the ends of inner casing 62 to a second position wherein inner casing 62 is raised sufficiently that it is in overlapped mating relationship with segment 18 but in spaced end to end relationship with segment 44 or lowered to a third position wherein inner casing 62 is in overlapped mating relationship with segment 18. The importance of the ability of inner casing 62 to slide between the three positions thus described will be shown hereinafter. The normal operating position for the gasket and gap bridging assembly 46 is in the first position described wherein both segment 18 and 44 are in overlapped mating relationship with inner casing 62.

Inner casing 62 is maintained in its first or normal operating position by holding means best understood with reference to FIGS. 3 and 5. Inner casing 62 has brackets 70 attached thereto 180° apart in a plane normal to the axis of rotation 14. Each bracket 70 has a hole 72 therethrough in the manner of previously described brackets 48 and 52. Brackets 70 and hole 72 therein are positioned to lie along a line parallel to the axis of rotation 14 extending through two bracket pairs 48, 52 disposed 180° apart on segments 18 and 44 respectively. This configuration can best be understood with reference to FIGS. 2 and 3. A short spacer 74 is disposed between each of the two bracket pairs 48, 70 and 70, 52 as shown in FIG. 5. A threaded rod 58 is passed therethrough and nuts 60 tightened on opposite ends to lock the assembly and, therefor, inner casing 62 in the first position. Thus, as assembled one short spacer 74 has brackets 48 and 70 tightly held against opposite ends thereof and a second short spacer 74 has brackets 70 and 52 tightly held against opposite ends thereof by nuts 60.

To provide electrical connection to the span unit (not shown), a rotatable electrical conduit is provided in a manner best understood with reference to FIGS. 1 and 2. Upper elbow 16 is provided with a packing gland 76 disposed coaxially with the axis of rotation 14. A strain relief assembly generally indicated as 78 is connected through the wall of inner casing 62. This is most easily accomplished as shown wherein a pipe 80 is passed through an appropriate hole in the wall of inner casing 62 and welded in place. The external end of pipe 80 is provided with gripping means 82 adapted to hold an electrical cable from sliding. For removal of gasket 64, gripping means 82 should lie close to the wall of inner casing 62. Pipe 80 is sized to extend substantially to the axis of rotation 14 where a threaded elbow 84 is attached so as to provide a threaded opening lying concentric with the axis of rotation in a plane normal thereto. A conduit pipe 86 is passed through packing gland 76 along axis of rotation 14 and threaded into elbow 84. On the end of conduit pipe 86 adjacent packing gland 76 a collector ring assembly 88 is attached. In this manner, a closed conduit path is provided interior of pivot conduit 12 extending from gripping means 82 to collector ring assembly 88. Electrical cable 90 is connected through this conduit path between external electrical equipment (not shown) and collector ring assembly 88. A second electrical cable 92 provides connection between collector ring assembly 88 and the electrical apparatus on the span units (not shown).

While the preferred embodiment of the present invention as hereinbefore described employs vertical cylindrical segments 18 and 44 of substantially identical internal diameters and a cylindrical casing 62 adapted to slide internally of segments 18 and 44, it is to be understood that segments 18 and 44 could be of different diameters by having opposite ends of casing 62 of different diameters. Likewise, segments 18 and/or 44 could be made to slide internally of casing 62 by providing sufficient distance between the ends of the appropriate segment 18, 44 and the associated brackets 48, 52.

Having thus described the construction of the preferred embodiment, the procedure for replacing the gaskets 64 and 66 is as follows:

Step 1: Disconnect the electrical cable 90 from its external electrical connection so as to provide a free end over which gasket 64 can be passed later in the procedure.

Step 2: Loosen the cover 94 on packing gland 76 so as to allow conduit pipe 86 to be moved longitudinally along axis of rotation 14.

Step 3: Raise conduit pipe 86 approximately 1 foot.

Step 4: Remove short spacers 74 by removing the nuts 60 and threaded rods 58 holding them in place. Following this step the apparatus should appear as shown in FIG. 6.

Step 5: Slide the inner casing 62 down into the lower pivot elbow 42 until there is approximately 2 inches clearance between cylindrical segment 18 and inner casing 62. This is shown in FIG. 7.

Step 6: Remove the upper gasket 64 from segment 18 by reaching up inside segment 18 and pulling the gasket 64 from groove 68 down over inner casing 62 and strain relief assembly 78 as shown by the ghosted position in FIG. 7.

Step 7: Raise the inner casing 62 up into pivot conduit 12 until there is approximate 2 inches of clearance between the bottom of casing 62 and segment 44. This is shown in FIG. 8.

Step 8: Remove the lower gasket 66 by reaching into the lower elbow 42 and pulling the gasket upward to the clearance area created in Step 7 and thence horizontally out of pivot 10. This is shown by the ghosted position of FIG. 8.

Step 9: Pull the upper gasket 64 down to the clearance area and slide it horizontally out of the pivot 10 along the electrical cable 90 to the end of the cable. This is shown in FIG. 9.

To install new gaskets 64 and 66 into gasket and gap bridging assembly 46, the foregoing removal procedure is merely reversed.

Certain variation possible in the design of the apparatus of the present invention and in the gasket removal/replacement procedure are worthy of particular note. In some installations, it may be desirable to have a replaceable gasket only in the position of the gasket 64 since this is the point of rotational contact. In such case, a more conventional packing could be substituted for gasket 66 and/or inner casing 62 made slidable only between its first position overlapped with both segments 18 and 44, and a second, lowered, position over- (c) a gasket and gap bridging assembly disposed along said axis of rotation between said cylindrical segments of said pivot and fixed conduits, said bridging assembly including a bridging conduit of a length relative to the spacing between said cylindrical segments such that in a first position said bridging conduit is in overlapped mating relationship with both said pivot conduit and said fixed conduit and in a second position said bridging conduit is in spaced end to end relationship with said pivot conduit, said bridging assembly further including means for releasably holding said bridging conduit in said first position and at least a gasket disposed between the overlapping surfaces of said bridging conduit and said pivot conduit to form a leak-proof rotatably junction therebetween when said bridging conduit is in said first position.

7. The improved center pivot for an irrigation system claimed in claim 6 wherein:
said bridging conduit is slidable along said axis of rotation between said first and second position.

8. The improved center pivot for an irrigation system claimed in claim 6 wherein:
said gasket and gap bridging assembly includes means connected between said lower bearing and said fixed conduit for holding said fixed conduit in said concentric, facing relationship relative to said cylindrical segment of said pivot conduit.

9. In a self-propelled center pivot irrigation system having one or more span units rotating about a center pivot on one or more wheeled power frames wherein the center pivot includes gasket means for allowing leak-proof rotation of a vertical pipe about an axis common to a fixed pipe supplying liquid under pressure to the rotating pipe, the improved center pivot comprising:
(a) a pivot conduit disposed vertically along an axis of rotation, said pivot conduit terminating at an upper end connectable to a span unit, said pivot conduit terminating at a lower end in a vertical cylindrical segment;
(b) a bearing and support assembly supporting said pivot conduit for rotation about said axis of rotation, said assembly having an upper bearing adjacent said upper end of said conduit and a lower bearing adjacent said lower end of said conduit;
(c) a fixed conduit connectable on one end to a source of liquid under pressure and terminating at the other end in a vertical cylindrical segment disposed along said axis of rotation in concentric, facing relationship to said cylindrical segment of said pivot conduit;
(d) means connected between said lower bearing and said fixed conduit for holding said fixed conduit in said concentric facing relationship relative to said cylindrical segment of said pivot conduit; and,
(e) a gasket and gap bridging assembly disposed along said axis of rotation between said cylindrical segments of said pivot and fixed conduits, said bridging assembly including a bridging conduit of a length relative to the spacing between said cylindrical segments such that in a first position said bridging conduit is in overlapped mating relationship with both said pivot conduit and said fixed conduit and in a second position said bridging conduit is in spaced end to end relationship with said pivot conduit, said bridging assembly further including means for releasably holding said bridging conduit in said first position and at least a gasket disposed between the overlapping surfaces of said bridging conduit and said pivot conduit to form a leak-proof rotatably junction therebetween when said bridging conduit is in said first position.

10. The improved center pivot for an irrigation system claimed in claim 9 wherein:
said bridging conduit is slideable along said axis of rotation between said first and second positions.

11. The improved center pivot for an irrigation system claimed in claim 9 and additionally comprising:
(a) a packing gland disposed in said upper end of said pivot conduit said axis of rotation;
(b) a strain relief conduit carried by said bridging conduit and extending from the exterior thereof on one end through the wall thereof interior to the axis of rotation on the other end, said exterior end including means for gripping an electrical connector; and,
(c) a conduit pipe disposed within said pivot conduit connected to said interior end of said strain relief conduit on one end and passing through said packing gland to the exterior of said pivot conduit on the other end, said latter named end being adapted to have a collector ring assembly connected thereto.

12. The improved center pivot for an irrigation system claimed in claim 9 wherein said means for releasably holding said bridging conduit in said first position comprises:
(a) first removable spacer means connected between said lower bearing and said bridging conduit; and
(b) second removable spacer means connected between said fixed conduit and said bridging conduit.

13. The improved center pivot for an irrigation system claimed in claim 12 wherein:
(a) said lower bearing includes first and second brackets in a plane normal to said axis of rotation, each of said brackets having a hole therethrough;
(b) said fixed conduit has third and fourth brackets attached thereto in a plane normal to said axis of rotation; each of said brackets having a hole therethrough;
(c) said bridging conduit has a fifth bracket having a hole therethrough attached thereto in a plane normal to said axis of rotation;
(d) said means for holding said fixed conduit in said facing spaced relationship relative to said cylindrical segment of said pivot conduit comprises a first threaded rod disposed to pass through the holes of said first and third brackets along a line parallel to said axis of rotation, a first spacer element positioned adjacent said first threaded rod and extending between said first and third brackets, and a pair of nuts threaded onto opposite ends of said first threaded rod to hold said first and third brackets tight against opposite ends of said first spacer element; and,
(e) said first and second spacer means comprise a second threaded rod disposed to pass through the holes in said second, fifth, and fourth brackets along a line parallel to said axis of rotation, second and third spacer elements positioned adjacent said second threaded rod and extending between said second and fifth brackets and said fifth and fourth brackets respectively, and a pair of nuts threaded onto opposite ends of said second threaded rod to hold said second and fifth brackets tight against opposite ends of said second spacer element and said fifth and fourth brackets tight against opposite ends of said third spacer element.

* * * * *